US 8,028,580 B2

(12) United States Patent
Millet

(10) Patent No.: US 8,028,580 B2
(45) Date of Patent: Oct. 4, 2011

(54) INERTIAL MEASUREMENT UNIT WITH ENHANCED ACCELERATION WITHSTAND CAPABILITY

(75) Inventor: Hervé Millet, Montamise (FR)

(73) Assignee: Thales (FR)

( * ) Notice: Subject to any disclaimer, the term of this patent is extended or adjusted under 35 U.S.C. 154(b) by 262 days.

(21) Appl. No.: 12/305,215

(22) PCT Filed: Jun. 22, 2007

(86) PCT No.: PCT/EP2007/056271
§ 371 (c)(1),
(2), (4) Date: Feb. 5, 2009

(87) PCT Pub. No.: WO2007/147896
PCT Pub. Date: Dec. 27, 2007

(65) Prior Publication Data
US 2009/0314083 A1  Dec. 24, 2009

(30) Foreign Application Priority Data

Jun. 23, 2006  (FR) ...................................... 06 05665

(51) Int. Cl.
*G01P 15/10*  (2006.01)

(52) U.S. Cl. ................... 73/514.29; 73/504.04

(58) Field of Classification Search ............... 73/504.04, 73/514.34, 514.29, 514.16; 310/329, 330, 310/331, 332
See application file for complete search history.

(56) References Cited

U.S. PATENT DOCUMENTS

| | | | | |
|---|---|---|---|---|
| 4,303,978 A * | 12/1981 | Shaw et al. | | 701/220 |
| 4,425,040 A * | 1/1984 | Ljung et al. | | 356/472 |
| 4,590,801 A * | 5/1986 | Merhav | | 73/510 |
| 5,225,838 A | 7/1993 | Kanter et al. | | |
| 5,515,725 A * | 5/1996 | Tabota et al. | | 73/514.34 |
| 5,703,295 A * | 12/1997 | Ishida et al. | | 73/593 |
| 5,734,246 A * | 3/1998 | Falangas | | 318/649 |
| 6,176,837 B1 * | 1/2001 | Foxlin | | 600/595 |
| 6,282,496 B1 * | 8/2001 | Chowdhary | | 701/220 |
| 6,409,687 B1 * | 6/2002 | Foxlin | | 600/595 |
| 6,498,996 B1 * | 12/2002 | Vallot | | 702/104 |
| 6,826,478 B2 * | 11/2004 | Riewe et al. | | 701/220 |
| 7,066,004 B1 * | 6/2006 | Kohler et al. | | 73/1.38 |
| 2002/0047700 A1 * | 4/2002 | Tabota | | 324/76.49 |
| 2002/0069702 A1 * | 6/2002 | Tabota | | 73/504.12 |
| 2002/0166379 A1 * | 11/2002 | Paros et al. | | 73/504.12 |
| 2003/0045816 A1 * | 3/2003 | Foxlin | | 600/595 |
| 2007/0100550 A1 * | 5/2007 | Hawkinson | | 701/220 |

OTHER PUBLICATIONS

Park S et al: "A Scheme for Improving the Performance of a Gyroscope-Free Inertial Measurement Unit"; Sensors and Actuators A, Elsevier Sequoia S.A., Lausanne, CH, vol. 121, No. 2, (Jun. 30, 2005), p. 410-420; XP004913707; ISSN: 0924-4247.

* cited by examiner

*Primary Examiner* — Hezron E Williams
*Assistant Examiner* — Samir Shah
(74) *Attorney, Agent, or Firm* — Lowe Hauptman Ham & Berner, LLP

(57) ABSTRACT

The present invention relates to an inertial measurement unit with enhanced resistance to acceleration, and it is characterized in that it comprises at least five accelerometers (Acc1 to Acc5), the sensing axes of which are arranged at various positions on the generatrix of a conical surface, and in that they comprise a device for detecting saturation of the accelerometers and a device for detecting abnormal biases.

4 Claims, 2 Drawing Sheets

INERTIAL MEASUREMENT UNIT WITH ENHANCED ACCELERATION WITHSTAND CAPABILITY

CROSS-REFERENCE TO RELATED APPLICATIONS

The present Application is based on International Application No. PCT/EP2007/056271, filed on Jun. 22, 2007, which in turn corresponds to French Application No. 06 05665, filed on Jun. 23, 2006, and priority is hereby claimed under 35 USC §119 based on these applications. Each of these applications are hereby incorporated by reference in their entirety into the present application.

FIELD OF THE INVENTION

The present invention relates to an inertial measurement unit with enhanced resistance to acceleration.

BACKGROUND OF THE INVENTION

Accelerometers equipping flying machines are used to work out their attitude parameters. However, when these machines are, in particular, helicopters, these accelerometers are subjected to strong accelerations generated by the vibrations of these helicopters, which are superposed on the actual acceleration of the bearer. A typical specification of vibrations has, for example, a white noise level of 0.02 $g^2$/Hz between 10 and 300 Hz to which sine lines are added with an amplitude up to 2.5 g at low frequency.

Furthermore, a new generation of accelerometric sensors, based on MEMS (Micro Electro Mechanical Systems) technology is currently coming to light. These sensors, initially intended mainly for motor vehicles, have performance compatible with low cost attitude systems for aircraft, such as the systems called "Attitude and Heading Reference Systems" (AHRS) or standby horizon systems. However, their measurement range is generally limited (typically 1 to 3 g).

The use of such accelerometers in the case of helicopters poses two problems:

1. Saturation. In the case of accelerometers such as, for example, the VTISCA 61T, the nominal performance range is located at 2 g and the saturation threshold is found at 2.7 g. The bandwidth of the sensor is less than 80 Hz.

The effective value of white noise seen through the transfer function of the accelerometer is 1.3 g. By assimilating the peak value to the value at 3σ, the white noise itself may generate 3.9 g at peak. Added to this white noise is one of the previously mentioned sine lines, which are all in the bandwidth of the accelerometer. The risk of saturation is therefore very high.

It is difficult to evaluate the impact of the saturation of accelerometers on the attitude performance, as this depends on the symmetry of the saturation. It is, however, not acceptable to have saturation in nominal operation.

2. Rectification. Typical rectification coefficients of accelerometers of the type envisaged are 5 mg/$g^2$. With an effective value of 1.3 g, a bias of around 8.5 mg is generated. When account is taken of the sine lines, the overall attitude error obtained is greater than 2°. As the attitude specification of an AHRS is typically 1° (at 95%), these values are not acceptable.

The outputs from the AHRS may also be used for piloting the aircraft. In this case, a typical specification value is 10 mg (95%). This specification also cannot be met.

Among the various solutions conceivable for solving these problems, it is possible to mention:

2. Using an accelerometer having both a range sufficient not to saturate and a low rectification coefficient. This is the solution currently adopted in AHRSs. Accelerometers having both a sufficiently high range to avoid saturation and a low rectification coefficient are of the controlled pendulum or VBA (Vibrating Beam Accelerometer) type. (The Honeywell QA 700 and SAGEM ACSIL models may be cited). Their cost is prohibitive for the intended applications.

2. A dual accelerometer solution: an accelerometer of range 2 g allowing conservation of the repeatability of long term bias associated with a large range accelerometer (typically 10 or 12 g). Thus the problem of saturation is solved, but not that of rectification. Indeed, low cost 12 g accelerometers have a much higher bandwidth (500 Hz) and a rectification coefficient that is also higher.

3. Suspended sensors solution. The first objectionable line is typically around 20 Hz. It would therefore be necessary to cut off the frequency spectrum below this value, which is difficult to conceive as very large amplitudes of displacement and problems of stability of misalignment are then encountered. It is also not possible to locate the suspension frequency between two lines as they are very close together.

SUMMARY OF THE INVENTION

The subject of the present invention is an inertial measurement unit which, when undergoing strong vibrations, preserves sufficient precision while being at a cost that is as low as possible.

The inertial measurement unit according to the invention is characterized in that it comprises at least five accelerometers, the sensing axes of which are arranged such that any three of them are not in the same plane and in that it comprises a device for detecting saturation of the accelerometers and a device for detecting abnormal biases.

According to one embodiment, these axes are arranged at various positions on the generatrix of an at least approximately conical surface.

According to an advantageous feature of the invention, the sensing axes of the accelerometers are distributed asymmetrically relative to the reference axes of the inertial measurement unit.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The solution of the invention is to retain the accelerometers of the 2 g type (saturation at 2.7 g) so as to benefit from their good long term bias stability performance and their low cost.

The conventional three-accelerometer axis system is replaced by an n-accelerometer configuration (n>4), the sensing axes of which are arranged at various positions on the generatrix of a surface which is, preferably, a cone of half-angle $\alpha$ at the apex. The value of the angle $\alpha$ will be determined as a function of the maximum acceleration that it is desired to measure along the vertical Z axis.

$$\alpha = \text{Arc cos(sat/accZ)}$$

sat: threshold value for saturation of the accelerometer
accZ: maximum acceleration along Z
For example, for a saturation threshold at 2.7 g and a maximum acceleration of 7 g, the angle $\alpha$ will be set to 67°.

Figure 1:
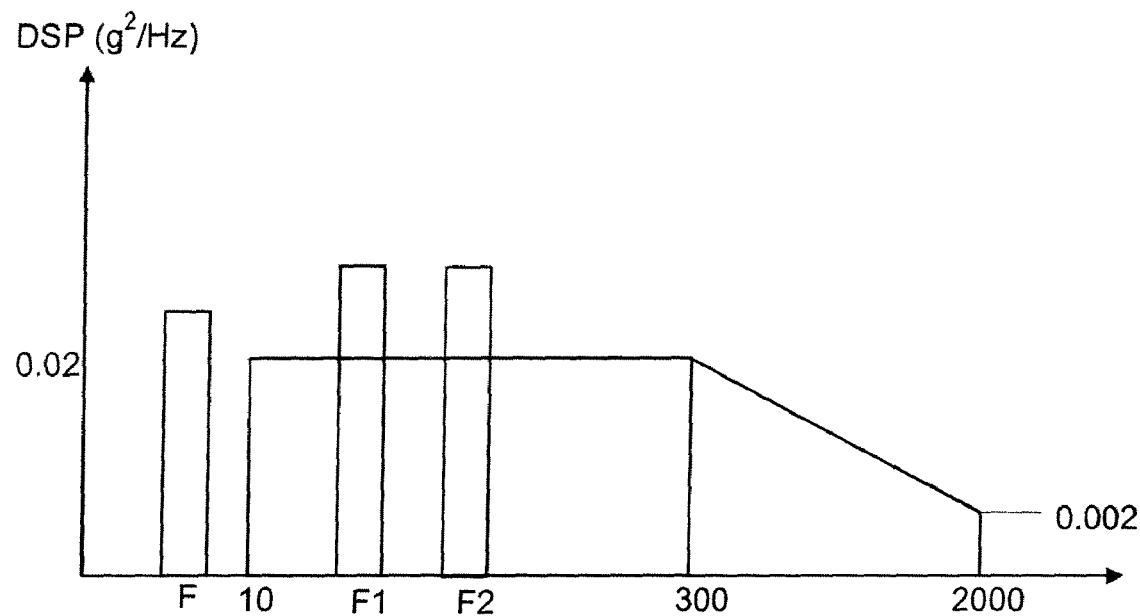
FIG. 1, mentioned above, is a diagram showing the evolution of the vibration level as a function of the frequency in a typical helicopter specification.
Figure 2:
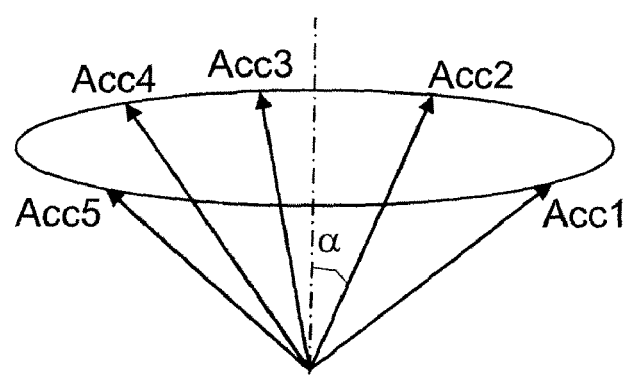
FIG. 2 is a simplified diagram showing an example arrangement of the sensing axes of the accelerometers of an IMU according to the present invention.
Figure 3:
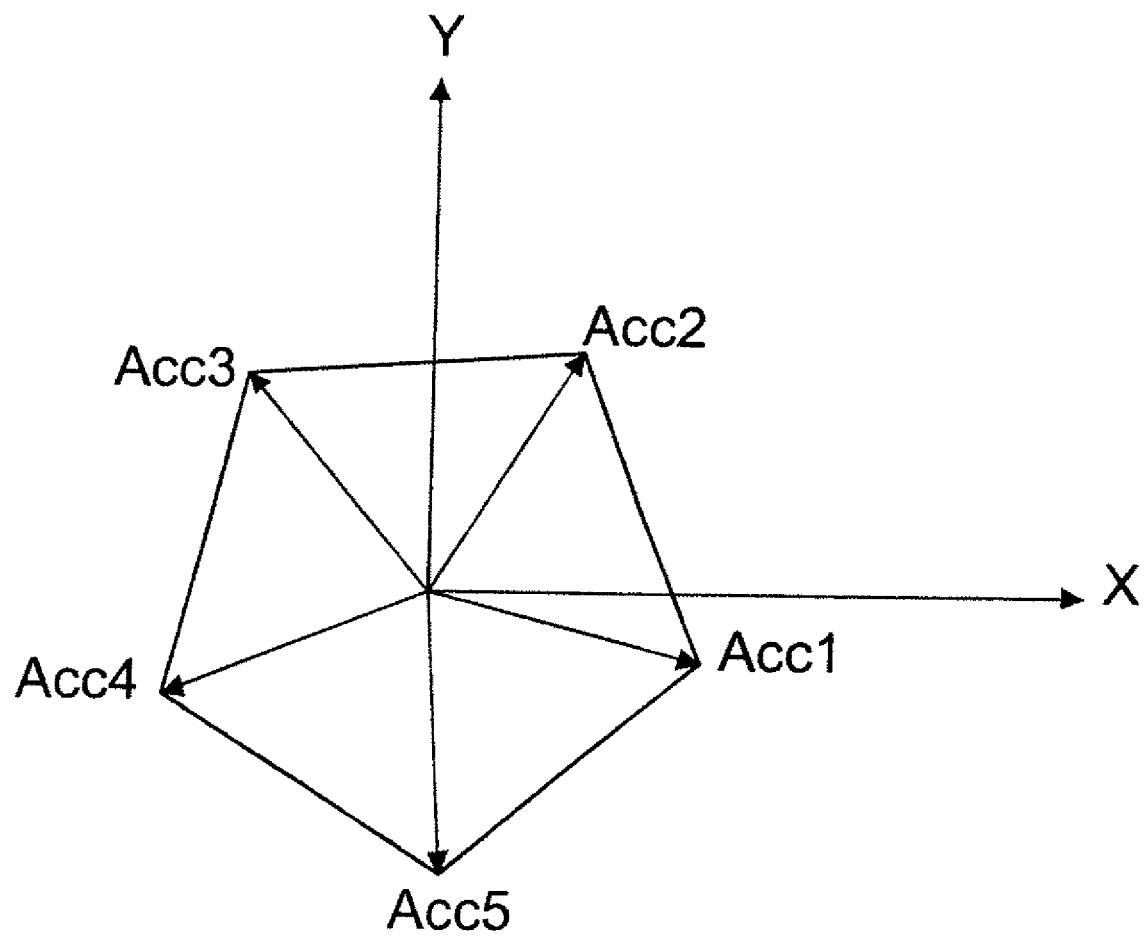
FIG. 3 is a simplified view from above showing an example distribution of the sensing axes of the accelerometers of an IMU according to the present invention.

FIG. 2 schematically represents an example of such an arrangement for the case of five accelerometers. In this figure, the accelerometric axes are represented as intersecting, but of course they are not necessarily intersecting.

In the remainder of this description the minimum number of accelerometers for this solution, which is five, will be considered. It is possible to optimize the number of sensors in the knowledge that a larger number will improve performance to the detriment of cost.

The device of the invention starts with the observation that the vibrations are not simultaneously present over all the axes. Consequently:
- the accelerometers are not all simultaneously saturated,
- the accelerometers do not all simultaneously have a high rectification level.

This hypothesis has been verified in qualification tests, where the vibrations are effected axis by axis, but it is generally true on an airplane or helicopter, where the vibrations are transmitted by the structures in privileged directions.

In a first period the accelerometers which are saturated are detected. This detection can be done very simply by comparing the measurement delivered with a threshold lying slightly below the saturation threshold. The saturated accelerometer(s) is (are) not taken into account in the following. This eliminates a maximum of n-3 accelerometers, so as to preserve a sufficient number of measurements for calculating the attitude. If more than n-3 accelerometers are saturated, none of them will be eliminated. The AHRS will continue to operate, but in backup mode.

In a second period the accelerometer(s) having an abnormal bias will be detected. This abnormal bias may, in particular, be generated by a rectification effect.

The algorithm used for this identification is a fault detection algorithm such as that using the vector parity method described in "Radix : Systèmes inertiels à composants liés" [Radix: Linked Component Inertial Systems], Capduès Editions. Other algorithm may also be used.

The measured vector is the total nongravitational acceleration vector of the bearer. In the presence of vibrations, the accelerometer whose sensing axis is closest to the axis of vibration has a larger rectification error than the others. The algorithm allows it to be eliminated and to preserve only the accelerometers having a lower rectification level.

In the case of vibrations along the vertical Z axis, which can occur in the qualification phase, all the accelerometers see the same vibration level. If they have similar rectification coefficients, they will have similar errors and it will not be possible to eliminate these. In contrast, the level seen by each accelerometer is weighted by cos $\alpha$. For example, for a value of $\alpha$ of 60° the acceleration level seen by each accelerometer is therefore divided by 2. The attitude error obtained then becomes acceptable.

The worst case depends on the number of accelerometers retained.

For a five-accelerometer configuration, this worst case is that in which the vibrations are seen at the same level by two accelerometers. In this case, only one or neither of these two accelerometers is eliminated. However, the level seen by these two accelerometers is divided by 0.707, and in addition three accelerometers that are not seeing the vibrations are still available. Performance is therefore slightly deteriorated.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An inertial measurement unit with enhanced resistance to acceleration, comprising
    five accelerometers, the sensing axes of which are arranged such that any three of them are not in the same plane;
    a device for detecting saturation of the accelerometers, and
    a device for detecting abnormal biases,
    wherein the sensing axes are arranged at various positions on the generatrix of a substantially conical surface.

2. The inertial measurement unit as claimed in claim 1, wherein the sensing axes of the accelerometers are distributed asymmetrically relative to reference axes of the inertial measurement unit.

3. The inertial measurement unit as claimed in claim 2, wherein the sensing axes of the accelerometers intersect at a single point.

4. The inertial measurement unit as claimed in claim 1, wherein the sensing axes of the accelerometers intersect at a single point.

* * * * *